United States Patent [19]

Reilly et al.

[11] Patent Number: 5,754,747
[45] Date of Patent: May 19, 1998

[54] ARCHITECTURE FOR NETWORK PRINTING SYSTEMS

[75] Inventors: Paul E. Reilly, San Jose; Ted W. Walker, Sunnyvale, both of Calif.

[73] Assignee: Apple Computer, Inc., Cupertino, Calif.

[21] Appl. No.: 709,876

[22] Filed: Sep. 9, 1996

Related U.S. Application Data

[63] Continuation of Ser. No. 470,969, Jun. 6, 1995.

[51] Int. Cl.$^6$ ................................................ G06K 15/00
[52] U.S. Cl. ........................................ 395/114; 395/112
[58] Field of Search ................................. 395/112, 114, 395/101, 500, 527, 385, 113, 117, 828, 831, 837, 838, 839, 827, 822, 882, 884; 358/444, 467, 468, 407, 404; 370/449, 245; 400/61, 62, 70, 71, 76

[56] References Cited

U.S. PATENT DOCUMENTS

| | | | |
|---|---|---|---|
| 5,075,874 | 12/1991 | Steeves et al. | 395/112 |
| 5,185,853 | 2/1993 | Cheng et al. | 395/114 |
| 5,293,466 | 3/1994 | Bringmann | 395/114 |
| 5,303,336 | 4/1994 | Kageyama et al. | 395/112 |
| 5,323,393 | 6/1994 | Barrett et al. | 370/85.8 |
| 5,359,660 | 10/1994 | Clark et al. | 380/25 |
| 5,361,332 | 11/1994 | Yoshida et al. | 395/114 |
| 5,371,837 | 12/1994 | Kimber et al. | 395/112 |
| 5,418,891 | 5/1995 | Yang | 395/114 |
| 5,438,528 | 8/1995 | Emerson et al. | 364/580 |
| 5,446,736 | 8/1995 | Gleeson et al. | 370/85.13 |

FOREIGN PATENT DOCUMENTS

| | | |
|---|---|---|
| 0598511 | 5/1995 | European Pat. Off. . |
| 0653700 | 5/1995 | European Pat. Off. . |

OTHER PUBLICATIONS

D.E. Comer et al., "Client–Server Programming and Applications," *Internetworking with TCP/IP*, vol. III, pp. 49–55, 1993.

*Primary Examiner*—Edward L. Coles, Sr.
*Assistant Examiner*—Dov Popovici
*Attorney, Agent, or Firm*—Burns, Doane, Swecker & Mathis, L.L.P.

[57] ABSTRACT

An architecture for a network printing system is provided that allows the network printer to achieve and enhance two-way communication between the host computers and the printer connected to the network. The architecture layers provide a normalized interface to the layers below so that all of the protocol/ports interact in the same way. More particularly, an imaging device protocol (IDP) and an IDP emulator enable various network service protocol/ports, both IDP and non-IDP ports, to communicate with the network printer by "seamless plug and play" connectivity. Furthermore, this architecture allows host computers to request network printer services through a client service connection protocol (CSCP) and IDP when these protocols are supported and emulates CSCP/IDP interactions when the network services do not support the CSCP/IDP protocols so that print job requests may be executed from the same print queue. This architecture also may be easily extended and integrated with new protocol/ports as they are developed and introduced.

14 Claims, 5 Drawing Sheets

ARCHITECTURE FOR NETWORK PRINTING SYSTEMS

This application is a continuation of application Ser. No. 08/470,969, filed Jun. 6, 1995.

FIELD OF THE INVENTION

The present invention is directed to an architecture for a network printing system that allows the printer to achieve an enhanced two-way communication between the computer and the network printer. More particularly, the present invention provides an imaging device protocol (IDP) and an IDP emulator which enable various network service protocol/ports, both IDP and non-IDP ports, to communicate with the printer by "seamless plug and play" connectivity.

BACKGROUND OF THE INVENTION

As the size of networked systems increases from a few connected computers located near each other to several thousand machines of various types and sizes scattered at great distances from each other, the demands on the network printers also increase. One of the most challenging demands in the implementation of network printers is connectivity. Typically, the network printer is a stand-alone peripheral device which is desired to perform in an increasing number of network and non-network communication environments. In network environments, the printer is desired to provide "seamless plug and play" connectivity for the continuous expansion of network service protocol/ports. For example, known network service protocol/ports that are desired to communicate with network printers are: printer access protocol (PAP)/LocalTalk (LT); PAP/EtherTalk (ET); transmission control protocol/internet protocol (TCP/IP); TCP/IP port 9100; LPR/TCP/IP; Novell remote printer or print server modes; bidirectional or unidirectional Centronics; AppleTalk Data Stream Protocol (ADSP)/EtherTalk; ADSP/LocalTalk; and Novell sequence packet exchange (SPX). These are just a few examples of the constantly increasing number of network protocol/ports that desire "plug and play" connectivity to the network printer.

A printer is a peripheral device that can be shared on a network connected to a print server. Also, a printer can directly connect to the network by including a network interface electronics or the network interface into the printer which allows the printer to run its own print server software and function as a regular node. In a typical Windows environment, the network printer is a oneway printer. In a one-way printer, the only communication path is from the host computer to the printer. As a result, the data is sent from the host computer to the printer without any ability for the printer to notify the host computer of the job status such as whether the print job has been successfully completed.

The use of a two-way printer has been developed for Macintosh systems (Apple Computer, Cupertino, Calif.). In the AppleTalk protocol used by the Macintosh systems, PAP is the protocol used for communication between the Macintosh host computers and printers. PAP sets up, maintains and terminates the connection between the host computer nodes and the network printer and also transfers the data from the host computers to the printers. PAP allows two-way communication from the network printer to the Macintosh host computer to the extent that the status of the network printer is sent to the Macintosh host computer through PostScript. However, most page description language (PDL) interperters only allow one job to be processed at one time which prevents asynchronous interaction between multiple clients and the network printer.

Typically, networks utilize shared resource printers. FIG. 1 illustrates the use of a conventional shared resource printer in a network. A plurality of host computers $1_0, 1_1, \ldots 1_n$, and a printer 5 are connected in a network. The printer 5 includes a disk 6 connected internally or externally to the printer 5 for storing the print jobs sent from the host computers $1_{0..n}$ before being printed by the printer 5. In shared resource printers, the host computer that first sends a print job to the network printer will have its job printed. Other host computers attempting to have a print job printed by the network printer while another job is being printed will not be able to access the network printer. Therefore, these host computers will repeatedly try to access the network printer during a timing scheme until the network printer becomes available. As a result, the speed of the network will be reduced by the network traffic due to the continuous polling of the host computers to the network printer during the time that the network printer is unavailable. This polling process is undesirable since a host computer will gain access to the printer, with only limited and possibly inexact arbitration after the print job is completed if a number of host computers are attempting to gain access while the printer is busy.

Traditionally, print servers provided access to the network printers and ran the programs necessary to create and operate a print queue for jobs sent to the printers from the host computers. The print queue is a directory that stores into the disk 6 the print jobs waiting to be printed. The print jobs are then printed from the print queue in an FIFO sequence. The print servers require storing the job request and entire job data by spooling this data to the disk 6. Depending on the job size, millions of bytes of data may be spooled to the disk and therefore a large sized disk is necessary.

Even if a large sized disk is used, the disk capacity for storing print jobs may be exceeded when a number of host computers send print jobs to the printer at approximately the same time. When the capacity of the disk is reached, a back up procedure will be implemented where the printer will be polled every two seconds until space in the disk becomes available in a similar manner as in the shared resource printer.

Print servers and a printer may be combined in the same machine on many networks for economical reasons. The main advantage for combining the printer and print servers is that files do not need to be sent from the host computer to the print server machine and then from there to the printer in such a configuration. However, the disadvantage of combining the printer and print servers is that the required control for the print queue and the printing activity takes away CPU time from other network activity. In either case, a disk is required to store the data for the entire print job and since the print job is sent from the host computer, spooled to a disk and then transmitted to the network printer when the printer becomes available, unnecessary network activity results.

Accordingly, it is desired to provide an architecture for a network printing system which enhances the two-way communication between the host computers and the network printer. Further along these lines, it is desirable to provide an architecture that supports a wide range of network services and may be extended and integrated as new protocol/ports are developed.

SUMMARY OF THE INVENTION

These and other objectives are achieved in accordance with the present invention by a component based architecture which provides a comprehensive structure to a plurality of protocol/ports that are desired to operate on the network. In an exemplary embodiment of the invention, the architecture provides an imaging device protocol (IDP) and an IDP emulator which enable a wide variety of network services to uniformly interface with the printer. The layered architecture allows the uniform interface to the plurality of network services, which are both IDP and non-IDP services, and also permits new protocol/ports to be easily extended and integrated.

As a further feature of the invention, the layered architecture allows the network printer to achieve a "seamless plug and play" connectivity for the variety of protocol/ports. The layers of the architecture are divided so that each layer provides a normalized interface to the layers above until the top layer of abstraction is reached in which all protocol/ports of network services interact in the same way.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION

Figure 2:
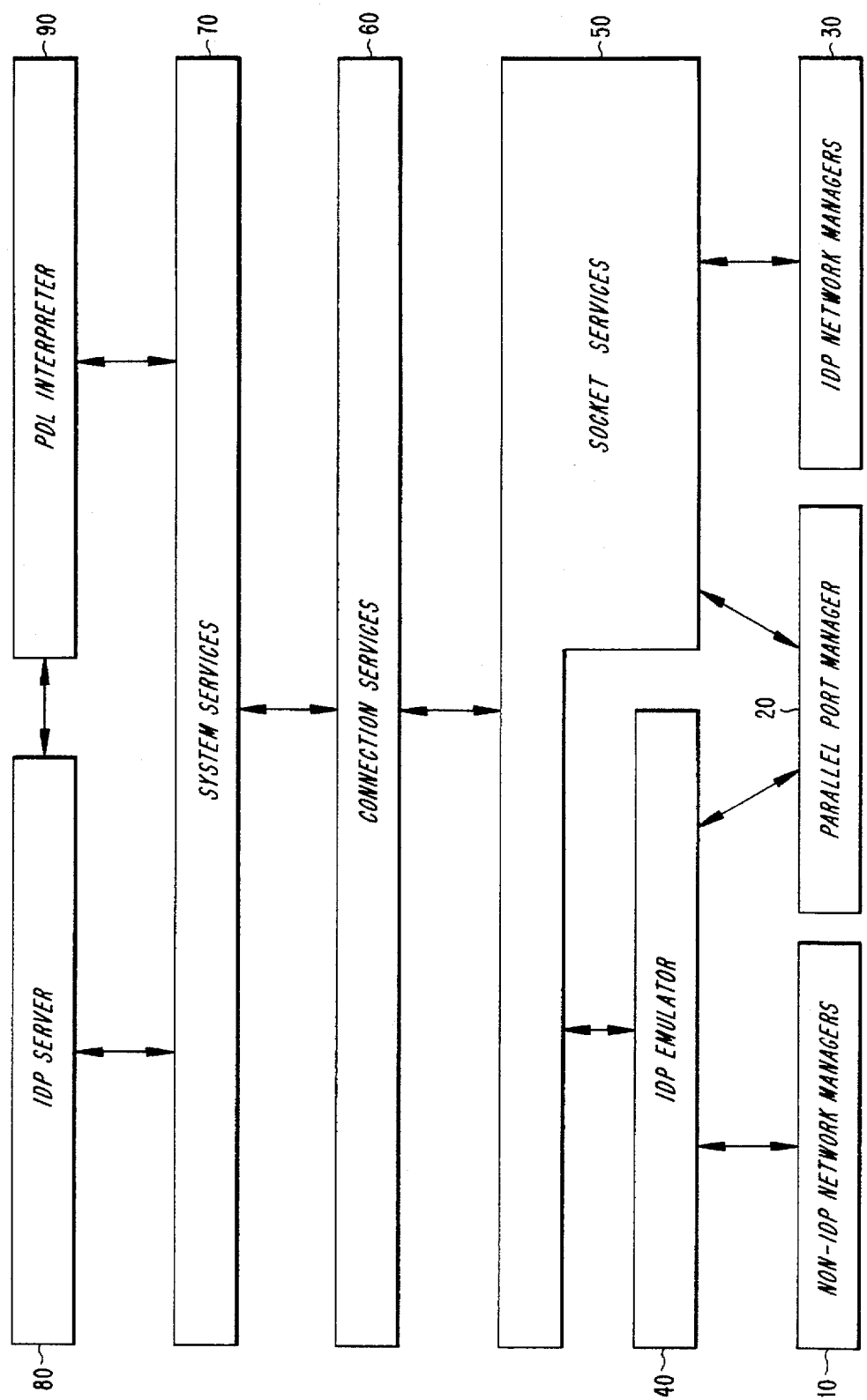
FIG. 2 illustrates the layers of the network architecture for an embodiment of the present invention.

FIG. 2 provides an illustrative embodiment for the layers of the architecture of the network printing system in an embodiment of the present invention. Each of these layers provides a normalized interface with the lower layers and their relationship will be described from the lower layers, which interact with the clients, to the upper layers where all of the protocols/ports interact with the printer in essentially the same way. The interfacing of these layers may be implemented in one or more static memory devices, such as a ROM, which is installed within the network printer.

At the lower layer of the architecture as illustrated in FIG. 2, are non-imaging device protocol (IDP) network managers 10. The non-IDP network managers 10 control network ports that communicate with protocols other than IDP. Examples of some non-IDP protocols are: PAP/LocalTalk, PAP/EtherTalk, TCP/IP port 9100, LPR/TCP/IP, Novell remote printer or print server modes and bidirectional or unidirectional Centronics. The non-IDP network managers 10 support these protocols to be backward compatible with existing communication protocols. The non-IDP clients cannot access all of the enhanced IDP features in the upper layers, which will be described in more detail, but these non-IDP clients will be able to enter the print queue for processing and will be fairly arbitrated with other print jobs from IDP clients.

IDP network managers 30 provide an interface for IDP protocol/ports. Some examples of protocol/ports that are presently configured for IDP mode communication include ADSP/ET, ADSP/LT, SPX (Novell), TCP/IP and bi-directional Centronics. These protocol/ports are able to communicate with all of the IDP features which enhance the two-way communication between the host computers and the network printer. However, many other existing protocol/ports may be modified to support IDP and new protocols/ports may be created to support IDP. The interface of the IDP network managers with these IDP protocol/ports is preferably accomplished with a modified version of the Berkeley socket interface.

The Berkeley socket interface is a socket standard implemented in Berkeley Software Distribution (BSD) UNIX 4.3. (*Interworking With TCP/IP*, Vol. 3, Comer et al., Prentice Hall, 1993, pp. 49–55). The conventional Berkeley socket interface has the following major calls: a socket call for creating a socket; a bind call for binding a socket to an end point of a known protocol/port; a listen call for placing a socket bound to a known port in a passive mode; an accept call for accepting incoming connections from a passive socket; a connect call for opening active connections to remote endpoints; a read call for reading data from existing connections; a write call for writing data to existing connections; and a close call for closing existing connections. In an embodiment of the present invention the Berkeley socket interface has simplified the major calls to a passive open call for combining the functionality of the conventional socket, bind, and listen commands and an active open call for combining the functionality of the conventional socket and connect calls. The conventional accept, read, write and close calls have simply been renamed for the modified version of the Berkeley socket interface in the present embodiment.

A parallel port manager 20 provides both a non-IDP UNIX I/O interface and an IDP capable socket interface. The parallel port manager 20 is designed to support a host computer port which alternates between using IDP and non-IDP drivers/utilities to interact with the network printer. An example of such a port is a bi-directional Centronics port. IDP mode communication over Centronics ports should take place using a session/transport/network layer protocol. One example of such a session/transport/network layer protocol is a socket simulation protocol (SSP) for allowing the Centronics port to be used in the same way as other network ports. The parallel port manager 20 is able to automatically sense the transitions between SSP and non-SSP data over Centronics ports.

The socket services layer 50 is the interface component to all socket interface I/O managers. Sockets are general purpose interprocess communication mechanisms which are logical entities through which programs or processes communicate with the network. Sockets are typically supported in libraries by UNIX implementations for operating systems such as DOS or OS/2 and for network operating systems such as Novell's netware and AppleTalk. A socket interface is a set of functions associated with a particular network node and when a client interfaces with the socket, information and network services may be requested and received.

An IDP emulator 40 enables connections over non-IDP ports so that the upper layers may uniformly interface with both IDP and non-IDP clients. The IDP emulator 40 monitors connection requests on all non-IDP protocol/ports from the non-IDP network managers 10 and the parallel port manager 20 and emulates IDP requests as the connection requests are received. When a connection request is received from a non-IDP client, the IDP emulator 40 builds an IDP print job request message. The IDP emulator 40 ensures that print jobs from non-IDP protocol/ports are arbitrated fairly. The IDP emulator 40 allows non-IDP print jobs to be queued with IDP print jobs so that all of the print jobs may be processed in the order from which the connection attempts were received.

The connection services layer 60 includes a client server connection protocol (CSCP) library. CSCP is a symmetric protocol that facilitates connection between servers and clients over connection based—stream oriented protocols such as ADSP, TCP and SPX. CSCP resides in the presentation layer of the OSI seven-layer model for interfacing with one or more session level protocols. CSCP facilitates client and server connections by allowing clients of CSCP stacks to request passive or active connections for specific services on a specific node and specifies the service using an alpha-numeric string. Server applications, such as IDP, will minimally open a passive connection through the CSCP stack which specifies the service provided with a service specifier string. Clients of the server open an active connection through CSCP by specifying an identical service specifier string. CSCP implementations on the client and server nodes then negotiate the ports or sockets over which the client/server connection will take place, establish the connection, and return to their clients. Once the client/server connection is achieved, CSCP functions are completed.

Furthermore, CSCP facilitates reconnection to previously connected hosts. IDP uses the reconnection mechanism to implement remote queuing features, to subsequently request job data and to send asynchronous status updates to clients which support IDP. More particularly, IDP only stores the job data request at the printer when the printer is busy printing another job and the actual job data will remain locally at the host computer. Thereafter, the network printer will call back the host computer which corresponds to the first job data request queued in the print queue after the print job is completed.

The system services layer 70 provides a uniform interface to all of the IDP and non-IDP network services. In a preferred embodiment, the system services 70 is an interface which is an extension of the UNIX I/O interface. Examples of the functions performed by the system services 70 are: open; close; reconnect; read; write; swrite; and ioctl. The swrite function is unique for the present embodiment. The swrite function enables a status description string to be passed to the I/O managers and the I/O managers may use or dispose of this status depending on the requirement of the protocol/port being managed.

The system services layer 70 also provides a buffered I/O layer for grouping read and write data into bytes of data which may be processed more efficiently. For example, buffers may be provided for 4K bytes of data. Thereby, the number of times that data is handed back and forth by eliminating the repeated processing of individual data and grouping the data in a larger block that may be easily processed.

The system services layer 70 interfaces with an IDP server 80 and a page description language (PDL) interpreter 90. The IDP server 80 is an application layer network protocol for enhancing the two-way communication between a host computer and the network printer. The IDP server 80 is independent of the network layers below and only requires that the transport be bidirectional. The IDP server 80 allows access to shared information in the network printer and enables two-way communication between the network clients and the network printer to exist at an enhanced level.

Some of the enhanced two-way communication provided by the IDP server 80 includes reading and modifying system parameters, adding and removing fonts, submitting print jobs and manipulating the print queue. By enabling clients of the printer to make job requests which are entered in the print queue without sending the actual print job data, an enhanced set of services for submitting print jobs, retrieving print data queue and asynchronously notifying clients with job status may be achieved. The PDL interpreter 90 may be provided for supporting PostScript, for example. Additional PDL interpreters may be provided to support other languages as desired. The presentation level data from non-IDP protocols/ports is assumed to be PDL data in the example configuration for the present embodiment. The non-IDP network managers 10 and the parallel port managers 20 may be implemented with a UNIX standard I/O interface in a preferred embodiment. The IDP emulator 40 then handles all of the non-IDP protocols/ports, provides a socket interface and emulates the CSCP/IDP interaction necessary to execute print job requests.

Figure 3:
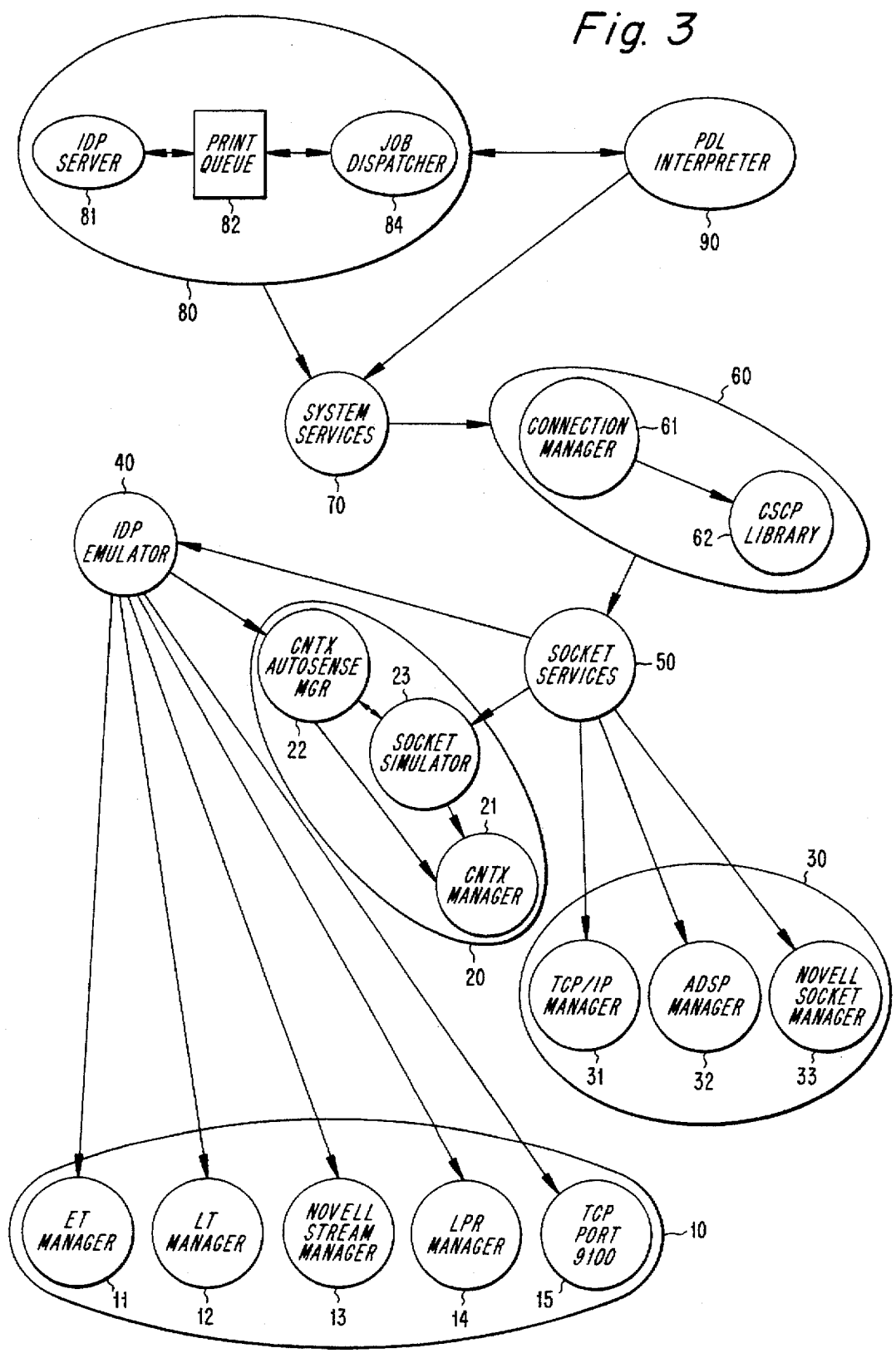
FIG. 3 illustrates a more detailed representation of the network architecture for an embodiment of the present invention.

FIG. 3 illustrates a more detailed example of the network services architecture for an embodiment of the present invention. The non-IDP network managers 10 correspond to a PAP/ET manager 11, a PAP/LT manager 12, a Novell stream manager 13, a LPR manager 14, and a TCP port 9100 manager 15 in this example. The parallel port manager 20 includes a Centronics manager 21 and the IDP network managers 30 include a TCP/IP manager 31, a ADSP manager 32 and a Novell socket manager 33 in this example. The parallel port manager 20 includes a Centronics autosense manager 22 for detecting between non-SSP and SSP data sent over the Centronics ports and a socket emulator 23 handles SSP communication. The IDP emulator 40 directs the non-IDP data to the appropriate non-IDP network manager 10. The connection services layer 60 is shown to include a connection manager 61 and a CSCP library 62 for providing the symmetric protocol that facilitates connection between servers and clients over connection-based stream-oriented protocols.

The system services layer 70 is connected to the connection manager 61. The system services layer 70 provides interaction between the IDP server 80 and the PDL interpreter 90. The IDP server 80 is shown in FIG. 3 to include a print queue 82 and a job dispatcher 84. The PDL interpreter 90 interacts with the IDP server 80 when the job dispatcher 84 dispatches a job from the print queue 82. The information from the print queue 82 proceeds through the layers to connect with a client and obtain the actual print job data that will proceed from the client back up through the layers to the PDL interpreter 90 for printing at the network printer.

Figure 4:
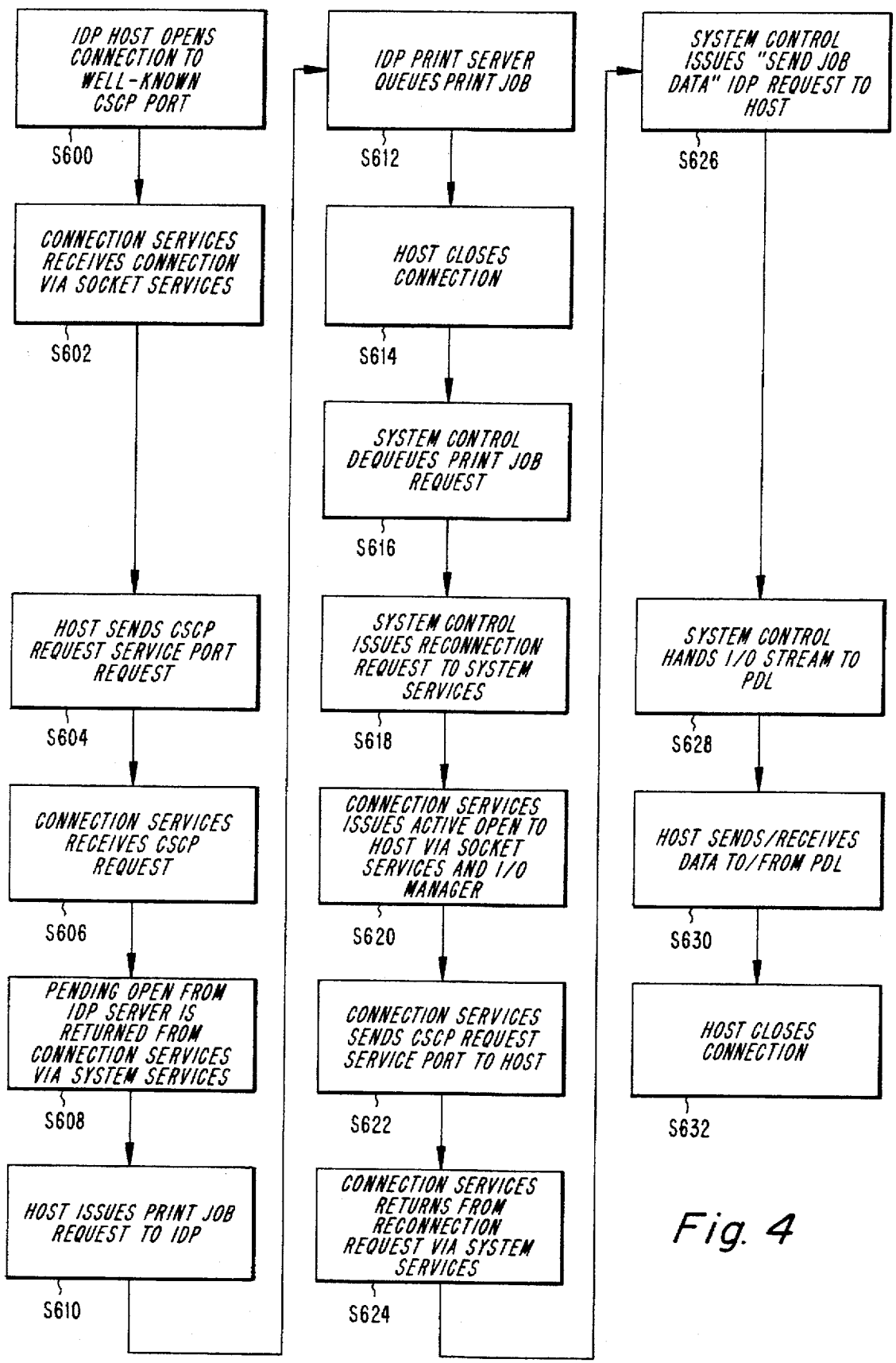
FIG. 4 illustrates a process for enabling connections between clients and the printer in an embodiment of the present invention.

FIG. 4 illustrates a process for enabling connections between IDP clients and the network printer in an embodiment of the present invention. At step S600, an IDP host and IDP network manager open a connection to a well known CSCP port. The connection is received by the connection services layer 60 via the socket services layer 50 at step S602 and the IDP host sends a CSCP request service port request at step S604. The connection services layer 60 receives the CSCP request at step S606 and a pending open from the IDP server 80 is received from the connection services layer 60 via the system services 70 at step S608. At step S610, the IDP host issues a print job request to the IDP server 80 and the IDP server queues the print job in the print queue 82 at step S612 before closing the connection at step. The system services layer 70 dequeues the print job request at step S16, and issues a reconnection request at step S618. The connection service 60 issues an active open to the host via the socket services layer 50 and the I/O manager 30 at step S620 and the connection services layer 60 also sends a CSCP request service port to the host at step S622. At step S624, the connection services layer 60 returns from a reconnection request via the system services layer 70. The system services layer 70 issues "a send job data" IDP request to the host at step S626 and then the systems services 70 sends the I/O stream to the PDL interpreter 90 at step S628. The host sends and receives data to and from the PDL interpreter 90 at step S630 and the host closes the connection at S632 when the sending and receiving of data is completed.

Figure 5:
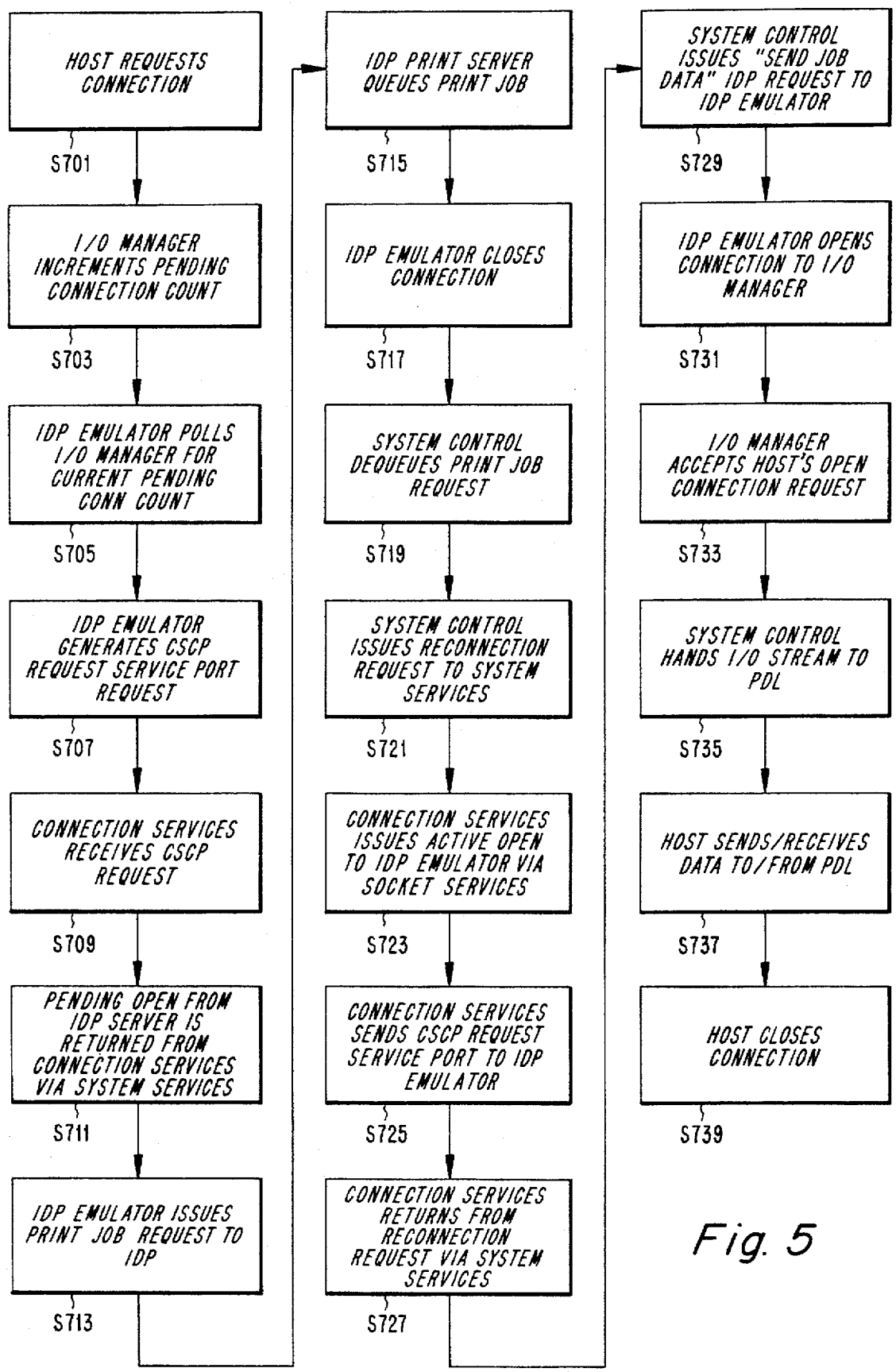
FIG. 5 illustrates a process for enabling connections between non-IDP clients and the printer in an embodiment of the present invention.

FIG. 5 illustrates the process for enabling connections between non-IDP clients and the printer in an embodiment of the present invention. At step S701, a host requests a connection and an I/O manager increments a pending connection count at step S703. The IDP emulator 40 polls the I/O manager for the current pending connection at step S705 and the IDP emulator generates a CSCP request service port request at step S707. The connection services 60 receives a CSCP request at step S709 and a pending open from the IDP server 80 is returned from the connection services 60 via the system services 70 at step S711. The IDP emulator 40 then issues a print job request to the IDP server 80 at step S713 and the IDP server queues a print job at step S715. The IDP emulator 40 then closes the connection to the IDP server 80 at step S717 before the system services 70 dequeues the print job request at step S719 and then issues a connection request at step S721. The connection services layer 60 issues an active open call to the IDP emulator 40 via the socket services layer 50 at step S723 and sends a CSCP request service port to the IDP emulator 40 at step S725. The connection services layer 60 returns from the reconnection request via the system services layer 70 at step S727 and then the system services 70 issues a "send job data" IDP request to the IDP emulator 40 at step S729. The IDP emulator 40 opens a connection to the corresponding I/O manager at step S731 and the corresponding I/O manager accepts the open connection request from the host at step S733. Next, the system services layer 70 sends the I/O stream to the PDL interpreter 90 at step S735, the host sends and receives data to and from the PDL interpreter 90 at step S737 before closing the connection to the host at step S739 when the sending and receiving of data is completed.

Figure 1:
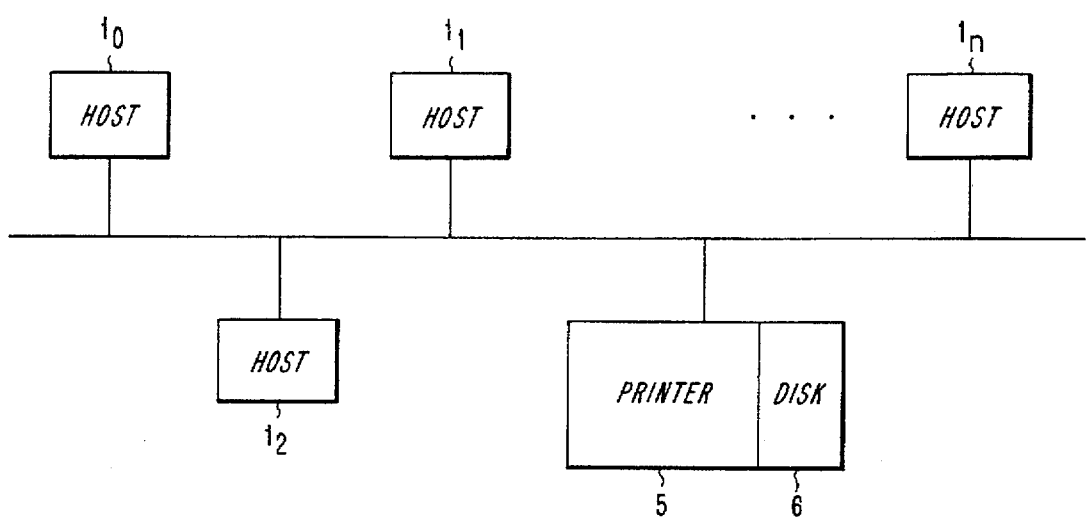
FIG. 1 illustrates a network using a conventional printing system.
Figure 6:
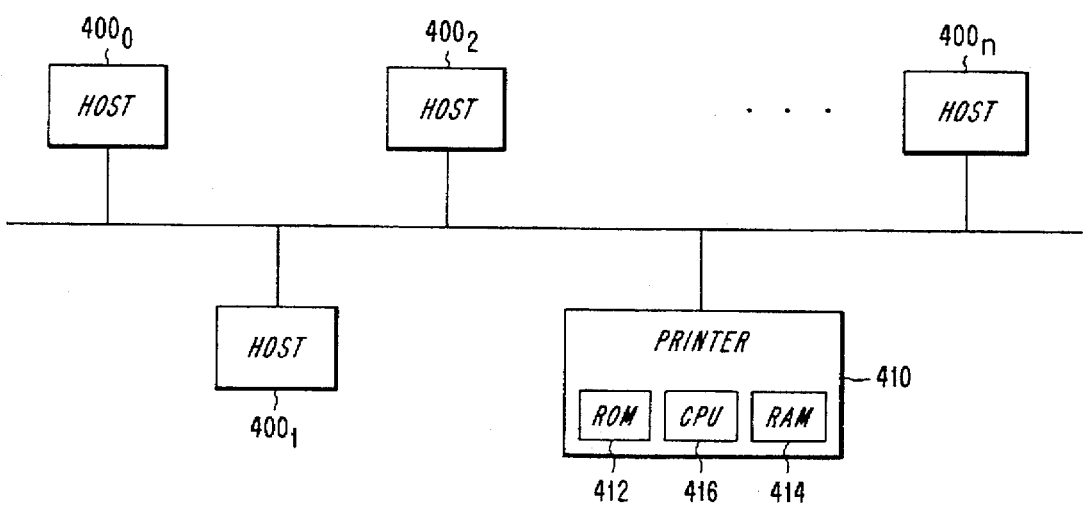
FIG. 6 illustrates a network configuration of a printing system in an embodiment of the present invention.

FIG. 6 illustrates a network configuration of a printing system for an embodiment of the present invention. In FIG. 6, a plurality of host computers $400_0, 400_1, \ldots 400_n$ and a printer 410 are connected in the network. The printer 410 includes a ROM 412, and RAM 414 and a CPU 416. The ROM 412 implements the interfacing of the host computers with the printer by the layers of architecture in response to control by the CPU 416. More than one ROM 412 may be used to implement the layers of architecture for interfacing. The RAM 414 is used to implement the print queue for storing the job information waiting to access the printer.

The network services architecture provides seamless plug and play connectivity for various IDP and non-IDP protocols/ports. The architecture layers provide a normalized interface to the layers below so that all of the protocol/ports interact in the same way. More specifically, this architecture allows host computers to request printer services through CSCP and IDP when these protocols are supported and emulates CSCI/IDP interactions when the network services do not support the CSCP/IDP protocols so that print job requests may be executed from the same print queue. This architecture also may be easily extended and integrated with new protocol/ports as they are developed and introduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An architecture for a network printing system comprising:

a plurality of network service protocol/ports for interfacing host computers to a network printer, said network service protocol/ports including imaging device protocol (IDP) ports and non-IDP ports;

a socket services layer for interfacing with said network service protocol/ports to request and receive information;

a connection services layer for facilitating connections between said network service protocol/ports and the network printer over connection based-stream oriented protocols, wherein said connection services layer comprises a client server connection protocol (CSCP) for opening a connection from one of said host computers to a network negotiating for a socket to implement the connection, and establishing the connection between said one host computer and said network printer:

a system services layer communicative with said connection services layer for providing a uniform interface for said IDP and non-IDP ports, an IDP server communicative with said system services layer for enabling two-way communication between said network printer and said host computers, a page description language (PDL) interpreter communicative with said IDP server and said system services layer for submitting print data from said non-IDP ports to the network printer; and an IDP emulator for emulating IDP connection requests when connection requests are received from any of said non-IDP ports to enable a uniform interface between all of said IDP and non-IDP ports and said connection services layer, said system services layer and said PDL interpreter.

2. An architecture according to claim 1, wherein said non-IDP ports comprise printer access protocol (PAP)/LocalTalk ports, PAP/EtherTalk ports, transmission control protocol (TCP)/internet protocol (IP) ports, LPR/TCP/IP ports, Novell remote printer/printer server mode ports, and bidirectional or unidirectional Centronics ports.

3. An architecture according to claim 1, wherein said IDP ports comprise AppleTalk Data Stream Protocol (ADSP) ports, ADSP/LocalTalk ports, Novell sequence pocket exchange (SPX) ports, TCP/IP ports, or bi-directional Centronics ports.

4. An architecture according to claim 1, wherein said IDP emulator generates an IDP print job request in response to a connection request from one of said non-IDP ports.

5. An architecture for a network printing system according to claim 1, wherein said connection services layer provides a call back and a reconnection to one of said host computers upon availability of said network printer which was previously unavailable to said one host computer.

6. An architecture for a network printing system according to claim 1, further comprising an input/output manager, wherein, in conducting an IDP connection between one of said host computers and said network printer, said one host computer and an IDP network manager open a connection to a CSCP port, said connection services layer receives the connection via said socket services layer, said one host computer sends a CSCP request-service-port request, said connection services layer receives the CSCP request and a pending open from the IDP server via said system services layer, said one host computer issues a print-job request to said IDP server, said IDP server queues a corresponding print job in a print queue and closes the connection, said system services layer dequeues the printjob request and issues a reconnection request, said connection services layer issues an active open to said one host converter via said socket services layer and said input/output manager, said connection services layer sends a CSCP request-service-port request to said one host computer, said connection services layer returns from a reconnection request via said system services layer, said system services layer issues a send-job-data IDP request to said one host computer, said systems services layer sends an input/output stream to said PDL interpreter, said one host computer sends and receives data to and from said PDL interpreter, and said one host computer closes the connection when sending and receiving of data is complete.

7. An architecture for a network printing system according to claim 1, further comprising an input/output manager, wherein, in response to one of said host computers requesting a non-IDP connection to said network printer, said input/output manager increments a pending connection count, said IDP emulator polls said input/output manager for a current pending connection, said IDP emulator generates a CSCP request-service-port request, said connection services layer receives the CSCP request, said connection services layer returns a pending-open from said IDP server via said system services layer, said IDP emulator issues a print-job request to said IDP server, said IDP server queues a print job, said IDP emulator closes the connection to said IDP server, said system services layer dequeues the print job request and issues a connection request, said connection services layer issues an active open call to said IDP emulator via said socket services layer and sends the CSCP request-service-port request to said IDP emulator, said connection services layer returns from a reconnection request via said system services layer, said system services layer issues a send job data IDP request to said IDP emulator, said IDP emulator opens a connection to said input/output manager, said input/output manager accepts the open connection from said one host computer, said system services layer sends an input/output stream to said PDL interpreter, said one host computer sends and receives data to and from said PDL interpreter and closes the connection to said one host computer when data sending and receiving is complete.

8. A network printing system comprising:
a plurality of host computers connected to a network; and
a network printer connected to the network, said network printer including
a plurality of network service protocol/ports for interfacing said host computers to the network printers said network service protocol/ports including imaging device protocol (IDP) ports and non-IDP ports,
a socket services layer for interfacing with said network service protocol/ports to request and receive information,
a connection services layer for facilitating connections between said network service protocol/ports and the network printer over connection based stream oriented protocols, wherein said connection services layer comprises a client server connection protocol (CSCP) for opening a connection from one of said host computers to the network, negotiating for a socket to implement the connection, and establishing the connection between said one host computer and said network printer:
a system services layer communicative with said connection services layer for providing a uniform interface for said IDP and non-IDP ports,
an IDP server communicative with said system services layer for enabling two-way communication between said network printer and said host computers,
a page description language (PDL) interpreter communicative with said IDP server and said system services layer for submitting print data from said non-IDP ports to the network printer, and
an IDP emulator for emulating IDP connection requests when connection requests are received from any of said non-IDP ports to enable a uniform interface between all of said IDP and non-IDP ports and said connection services layer, said system services layer and said PDL interpreter.

9. A network printing system according to claim 8, wherein said connection services layer provides a call back and a reconnection to one of said host computers upon availability of said network printer which was previously unavailable to said one host computer.

10. A method for interfacing with a network printing system, comprising the steps of:

(a) interfacing network host computers to the network printing system with network service protocol/ports including imaging device protocol (IDP) ports and non-IDP ports;

(b) interfacing said network service protocol/ports with a socket services layer to receive and request information;

(c) facilitating connections between said network service protocol/ports and the network printing system over connection based-stream oriented protocols with a connection services layer wherein said connection services layer comprises a client server connection protocol (CSCP) for opening a connection from one of said host computers to the network printing system negotiating for a socket to implement the connection and establishing the connection between said one host computer and the network printing system;

(d) providing a uniform interface for said IDP and said non-IDP ports by a system services layer communicative with said connection services layer;

(e) enabling two-way communication between said network host computers and the network printing system with an IDP server communicative with said system services layer;

(f) submitting print data from said non-IDP ports to a network printer of the printing system by a page description language (PDL) interpreter communicative with said IDP server and said system services layer; and (g) emulating IDP connection requests when connection requests are received from any of said non-IDP ports to enable a uniform interface between all of said IDP and non-IDP ports and said connection services layer, said system services layer and said PDL interpreter.

11. A method according to claim 10, wherein said step (g) comprises the step of generating an IDP print job request in response to a connection request from one of said non-IDP ports.

12. A method according to claim 10, including the step of providing, via said connection services layer, a call back and a reconnection to one of said host computers upon availability of said network printer which was previously unavailable to said one host computer.

13. A computer readable medium comprising program instruction layers for:

(a) interfacing network host computers to a network printing system with network service protocol/ports including imaging device protocol (IDP) ports and non-IDP ports;

(b) interfacing said network service protocol/ports with a socket services layer to receive and request information;

(c) facilitating connections between said network service protocol/ports and the network printing system over connection based-stream oriented protocols with a connection services layer, wherein said connection services layer comprises a client server connection protocol (CSCP) for opening a connection from one of said host computers to the network printing system negotiating for a socket to implement the connection, and establishing the connection between said one host computer and the network printing system;

(d) providing a uniform interface for said IDP ports and said non-IDP ports by a system services layer communicative with said connection services layer;

(e) enabling two-way communication between said network host computers and the network printing system with an IDP server communicative with said system services layer;

(f) submitting print data from said non-IDP ports to a network printer of the network printing system by a page description language (PDL) interpreter communicative with said IDP server and said system services layer; and (g) emulating IDP connection requests when connection requests are received from any of said non-IDP ports to enable a uniform interface between all of said IDP and non-IDP ports and said connection services layer, said system services layer and said PDL interpreter.

14. A computer readable medium according to claim 13, further comprising program instruction layers for providing, via said connection services layer, a call back and a reconnection to one of said host computers upon availability of said network printer which was previously unavailable to said one host computer.

* * * * *